United States Patent
Beals

(10) Patent No.: US 9,621,724 B2
(45) Date of Patent: Apr. 11, 2017

(54) CUSTOMER SERVICE CALL ROUTING

(71) Applicant: EchoStar Technologies L.L.C., Englewood, CO (US)

(72) Inventor: William Michael Beals, Englewood, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 65 days.

(21) Appl. No.: 14/185,723

(22) Filed: Feb. 20, 2014

(65) Prior Publication Data

US 2015/0237204 A1    Aug. 20, 2015

(51) Int. Cl.
*H04M 1/64* (2006.01)
*H04M 3/51* (2006.01)
*G06F 11/30* (2006.01)
*H04M 11/00* (2006.01)

(52) U.S. Cl.
CPC ....... *H04M 3/5166* (2013.01); *G06F 11/3006* (2013.01); *G06F 11/3055* (2013.01); *H04M 2203/1075* (2013.01); *H04M 2203/555* (2013.01)

(58) Field of Classification Search
CPC ......... H04M 2201/38; H04M 2201/42; H04M 2203/251; H04M 2203/253; H04M 3/493; H04M 7/0009; H04M 7/0027
USPC .......................................... 379/88.01–88.19
See application file for complete search history.

(56) References Cited

U.S. PATENT DOCUMENTS

| | | | |
|---|---|---|---|
| 9,024,771 B1 * | 5/2015 | Kuffner, Jr. ............ | G08B 21/18 340/679 |
| 2003/0131311 A1 * | 7/2003 | McNamara .................. | 714/809 |
| 2004/0160325 A1 * | 8/2004 | Yamashita ............. | G06Q 10/10 340/573.1 |
| 2004/0247106 A1 * | 12/2004 | Mullis et al. ............ | 379/211.02 |
| 2005/0207545 A1 * | 9/2005 | Gao et al. ................. | 379/88.17 |
| 2007/0133759 A1 * | 6/2007 | Malik et al. ..................... | 379/80 |
| 2009/0262254 A1 * | 10/2009 | Reams ................. | G01R 31/362 348/734 |
| 2011/0023074 A1 * | 1/2011 | Nguyen ................. | H04N 17/00 725/110 |
| 2012/0054797 A1 * | 3/2012 | Skog et al. ..................... | 725/41 |
| 2015/0172748 A1 * | 6/2015 | Navarro ............. | H04N 5/44543 725/41 |

FOREIGN PATENT DOCUMENTS

WO    WO 2004045130 A2 *    5/2004    ............ H04M 3/301

* cited by examiner

*Primary Examiner* — Solomon Bezuayehu
(74) *Attorney, Agent, or Firm* — Seed IP Law Group LLP

(57) ABSTRACT

Customer service calls to media service providers are addressed by remotely monitoring and diagnosing the customer's installed equipment. Such remote diagnosis decreases the need for assistance from customer service representatives and on-site repair technicians. In a method of operating a customer service routing system for a media service provider, subscriber equipment is first identified and then data specific to the subscriber equipment is collected. Relevant data can be maintained as an equipment health history in a database that is updated periodically by automatic monitoring. The database can be located within a remote server. Equipment data can be extracted automatically and relayed directly to the subscriber, thereby bypassing interaction with a customer service representative.

21 Claims, 7 Drawing Sheets

CUSTOMER SERVICE CALL ROUTING

BACKGROUND

Technical Field

The present disclosure relates to the field of multimedia receivers, and in particular, to the coordination of remote monitoring data with an interactive response system.

Description of the Related Art

Entertainment media providers such as cable TV companies and satellite companies spend a significant portion of their operational budgets on installation of subscriber equipment and customer service calls pertaining to such equipment. The subscriber equipment typically includes coaxial cable or a roof-mounted parabolic antenna, one or more receivers such as a set top box (STB), a digital video recorder (DVR), which may be external or internal to the STB, and remote control devices that viewers use to communicate with their STBs.

In response to a real or perceived equipment failure or an operational anomaly, a customer may contact the media provider customer service department, by telephone or e-mail. When a customer service call is received at the media provider, the call is initially handled by a computerized interactive voice response (IVR) system. The IVR system prompts the user for identification information and attempts to determine the reason for the call. Once the reason for the call is known, it is determined whether the call can be resolved automatically through the IVR system or whether the call must be routed to a human customer service representative (CSR) for resolution. There is a significant cost saving to the media provider if customer service calls are resolved by the automated IVR system without involving the human CSR. Reducing CSR labor costs by handing service calls within the IVR system is understood by media service providers to be one of the best ways to increase profitability.

By collecting statistics on the nature of customer service calls, media providers can evaluate where to focus their efforts to increase the IVR system's capability to automatically handle service calls. For example, historical records among media providers show that many of the service calls are due to STB remote control devices having insufficient battery power. Another common problem for satellite subscribers in particular is decreased signal strength due to inclement weather, for example, snow accumulating on the satellite receiving antenna, or signal interference from wind or heavy precipitation.

BRIEF SUMMARY

Customer service by a media service provider can be augmented by remotely monitoring and diagnosing a subscriber's installed equipment prior to the customer placing a phone call to report a problem. Remote monitoring data is stored in an equipment health server database. Such remote diagnosis and proactive notice to the user and the interactive response system at the media service provider decreases the need for customer assistance from the customer service representative and also from on-site repair technicians.

The first piece of information that the interactive response system gathers from a subscriber is the subscriber's account identification. The subscriber account can have more than one associated receiver, for example, or one or multiple set top boxes (STBs) located in different rooms of the subscriber's residence. Once it is known which STB is the subject of the service call, there is an opportunity for the health server system to review equipment data specific to that particular STB. Such equipment data can be maintained as an STB health history in the health server database, and updated at regular time intervals by automatic monitoring of the STB. In one embodiment, the health history database is located within a remote server. Equipment data can be extracted directly by the health server system and communicated to the interactive response system for use in handling service calls. For example, the STB can be programmed to store a record of the battery charge level of the remote control device associated with the STB. Or, once the customer is identified, the weather can be checked at the location of the equipment to determine if precipitation, wind, or snow may be affecting the signal strength. Such information can then be used to guide the interactive response script in response to a subscriber inquiry.

DETAILED DESCRIPTION

Figure 1:
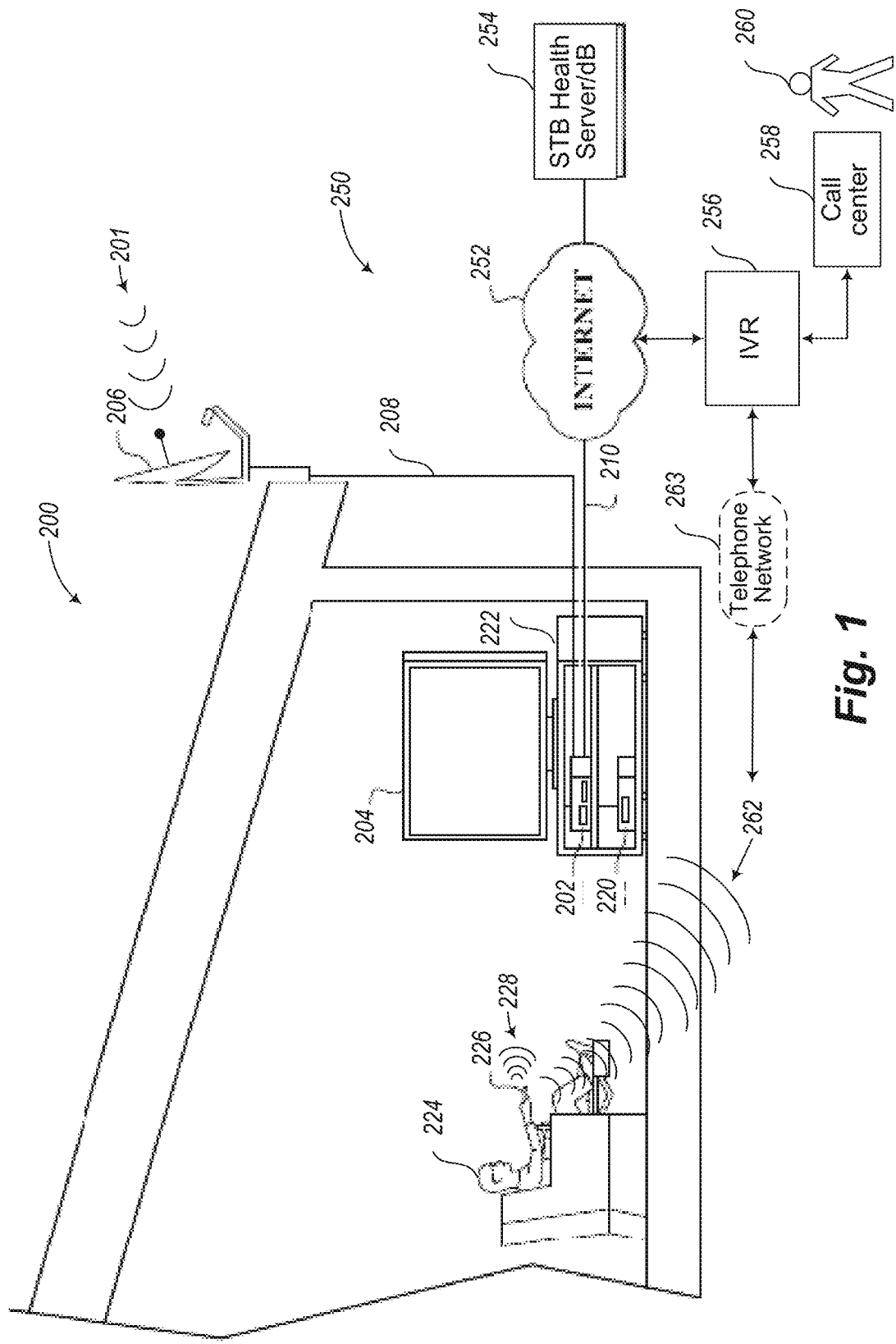
FIG. 1 is a schematic illustration of an exemplary residential media entertainment system coupled to a call routing service, according to one embodiment.

In this specification, embodiments of the present disclosure illustrate a subscriber satellite television service as an example. This detailed description is not meant to limit the disclosure to any specific embodiment. The present disclosure is equally applicable to cable television systems, broadcast television systems, Internet streaming media systems, or other television or video distribution systems that include user hardware, typically in the form of a receiver or set top box that is supported by the media provider or by a third party maintenance service provider. Such hardware can also include, for example, digital video recorder (DVR) devices and/or digital-video-disc (DVD) recording devices or other accessory devices inside, or separate from, the set top box.

Throughout the specification, the term "subscriber" refers to an end user who is a customer of a media service provider and who has an account associated with the media service provider. Subscriber equipment resides at the subscriber's address. The terms "user" and "viewer" refer to anyone using part or all of the home entertainment system components described herein. The term "customer" refers to a person who places a service call.

Throughout the specification, the acronym "IVR" which stands for interactive voice response refers to any form of interactive response for example, a message-based interaction, and is not limited to conventional voice-based IVRs. IVRs are widely known as telephone scripts that guide callers through a customer service menu of options. Callers are instructed to enter digits via a telephone keypad to narrow down the subject of their inquiry, to receive more efficient customer service. In the event that a script executed by an IVR system is implemented via e-mail or text messaging instead of via telephone, the IVR system as described in embodiments herein is meant to include such a data-based script.

One skilled in the art will recognize that the present disclosure can also apply to other types of systems that offer technical support to end users. Such systems can include computer systems, networking systems, telephone systems, industrial equipment systems, medical equipment systems, and the like. While the disclosure shows and describes media-related embodiments, it will be understood by those skilled in the art that various other changes in the form and details may be made therein without departing from the spirit and scope of the invention.

The disclosure uses the term "signal" in various places. One skilled in the art will recognize that the signal can be any digital or analog signal. Those signals can include, but are not limited to, a bit, a specified set of bits, an NC signal, or a D/C signal. Uses of the term "signal" in the description can include any of these different interpretations. It will also be understood to one skilled in the art that the term "connected" is not limited to a physical connection but can refer to any means of communicatively or operatively coupling two devices.

As a general matter, the disclosure uses the terms "television converter," "receiver," "set top box," "television receiving device," "television receiver," "television recording device," "satellite set top box," "satellite receiver," "cable set top box," "cable receiver," and "content receiver," to refer interchangeably to a converter device or electronic equipment that has the capacity to acquire, process and distribute one or more television signals transmitted by broadcast, cable, telephone or satellite distributors. DVR and "personal video recorder (PVR)" refer interchangeably to devices that can record and play back television signals and that can implement playback functions including, but not limited to, play, fast-forward, rewind, and pause. As set forth in this specification and the figures pertaining thereto, DVR and PVR functionality or devices can be combined with a television converter. The signals transmitted by these broadcast, cable, telephone, satellite, or other distributors can include, individually or in any combination, Internet, radio, television or telephonic data, and streaming media. One skilled in the art will recognize that a television converter device can be implemented, for example, as an external self-enclosed unit, a plurality of external self-enclosed units or as an internal unit housed within a television. One skilled in the art will further recognize that the present disclosure can apply to analog or digital satellite set top boxes.

As yet another general matter, it will be understood by one skilled in the art that the term "television" refers to a television set or video display that can contain an integrated television converter device, for example, an internal cable-ready television tuner housed inside a television or, alternatively, that is connected to an external television converter device such as an external set top box connected via cabling to a television. A further example of an external television converter device is the EchoStar Hopper combination satellite set top box and DVR.

In the figures, identical reference numbers identify similar features or elements. The sizes and relative positions of the features in the figures are not necessarily drawn to scale.

Turning now to the drawings, FIG. 1 illustrates an exemplary media subscription service environment that includes a content receiver system 200 and a content provider support network 250, according to one embodiment. A basic content receiver system 200 includes a content receiver 202, also called a set top box 202 in some systems, communicatively coupled to a source of media content, for presentation on a display 204. The media content is provided as a media signal 201. The content provider support network 250 connects the subscriber 224 to an operator who can provide ongoing support for equipment, including both hardware and software, supplied by a media service provider.

In the exemplary embodiment shown in FIG. 1, the content receiver system 200 is a home media entertainment system, the media signal 201 is a satellite signal received by the rooftop-mounted satellite receiving antenna 206, and the content provider support network 250 is associated with a satellite television subscription service. The content receiver is a set top box 202 that receives media content from the satellite receiving antenna 206 via a communication link 208.

While the set top box 202 is described herein as being connected to a satellite receiving antenna 206, in other embodiments the set top box 202 can receive media content from other sources. For example, the set top box 202 can receive media content via an antenna which receives terrestrial broadcast signals. Alternatively, the set top box 202 can receive media content via the media signal 201 received via a broadband cable subscriber service. Additionally or alternatively, the set top box 202 can receive media content via the media signal 201 received directly from the Internet 252 via a network communication link 210, using an Internet-based media subscription service. Furthermore, a content provider may provide to the subscriber multiple media signals 201 via satellite (as shown) and/or via the Internet, broadband cable and/or Internet, or in any other suitable way.

The set top box 202 can be coupled to a television, or the set top box 202 can be in the form of hardware built into a television, wherein the set top box receives content from the media service provider. Alternatively, the set top box 202 can be any electronic device that receives media content by accessing the Internet 252; for example, a gaming console, a smart phone, a tablet computer, a laptop computer, or a desktop computer.

The display 204 can be any kind of video display device such as a cathode ray tube display, a liquid crystal display (LCD), a plasma display, a television, a computer monitor, a rear projection screen, a front projection screen, a heads-up display, or any other electronic display device. The display 204 can include audio speakers, or the display 204 can be coupled to separate audio speakers. The term "for display" as used herein generally includes presentation of an audio component as well as a video component of the media signal 201.

The communication links 208 and 210 typically are wired connections such as one or more coaxial cables. One skilled in the art will recognize that other methods and other systems of delivering the media signal 201 to the set top box 202 may be possible. For example, one or both of the communication links 208 and 210 can be wireless links.

The content receiver 202 optionally further includes one or more peripheral devices 220 such as a media playback device including, but not limited to, a DVD player, a VCR, a stereo, a television, a game console, or a stand-alone DVR device that provides an alternate source of content directly to the display 204 via a wireless or a wired connection 222. Any of the peripheral devices 220 can be subscriber-owned devices, or they can be supplied by the media subscription service.

The remote control 226 can be operated by a user, for example, the subscriber 224, to cause the set top box 202 to display received content on the display 204. The remote control 226 may also be used by a viewer to display a programming guide and to communicate program selections to the set top box 202. The remote control 226 is communicatively coupled to the set top box 202 via a wireless path 228, for example, an infrared (IR) signal. The remote control 226 can be used to send commands to the satellite set top box 202, including channel selections, display settings, and DVR instructions. The wireless path 228 can use, for example, infrared or UHF transmitters within the remote control 226. One example of an embodiment of the remote control 226 is the EchoStar Technologies Corporation 40.0 Remote Control, that includes an IR transmitter and an ultra-high frequency (UHF) transmitter. The remote control 226 may be able to send signals to the other peripheral devices 220 that form part of the content receiver system 200. The set top box 202 may also be able to send signals to the remote control 226, including, but not limited to, signals to configure the remote control 226 to operate the other peripheral devices in the content receiver system 200. In some embodiments, the remote control 226 has a set of Light Emitting Diodes (LEDs). Some remote controls can include Liquid Crystal Displays (LCDs) or other screens. The remote control 226 can include buttons, dials, or other man-machine interfaces. While the remote control 226 can often be the common means for a user to communicate with the satellite set top box 202, one skilled in the art will recognize that other means of communicating with the set top box 202 are available, including, but not limited to attached keyboards, smart phones, front panel buttons or touch screens.

The satellite receiving antenna 206 receives media content via the media signal 201 from one or more satellite transponders in earth orbit. Each satellite transponder is, for purposes of the content receiver system 200, a source of content that transmits one or more media channels, such as HBO, ESPN, pay-per-view channels, etc., to the satellite receiving antenna 206. A satellite television distributor can transmit one or more satellite television signals to one or more satellites. Satellite television distributors can utilize several satellites to relay the satellite television signals to the subscriber 224. Each satellite can have several transponders. Transponders transmit the satellite signal from the satellite to the satellite receiving antenna 206.

The satellite receiving antenna 206 can focus the satellite signal on one or more low-noise block filters (LNBF), also referred to as low-noise block down converters (LNBDC). The LNBFs can de-polarize and initially process the signal. This initial processing can include filtering noise from the signal and down-converting the signal. Down-conversion is sometimes required to transmit the satellite signal through the communication link 208.

The set top box 202 is also coupled, by the network communication link 210, to the content provider support network 250, via the Internet 252. The content provider support network 250 includes a equipment health server 254, an interactive voice response (IVR) system 256, and a customer service call center 258. The customer service call center 258 provides a staff of human customer service representatives (CSRs) 260.

It is in the interest of the service provider to ensure that the subscriber 224 has a very good experience using the service, and thus continues to use the service for the long term, paying their subscription fee and encouraging others to sign up for the same service. To provide a good experience, the service provider will want to ensure that as few problems with the equipment occur as possible and, in the event problems do occur, to solve the problems quickly and also make the subscriber 224 feel that a high quality of customer service is being provided.

One way to provide high-quality customer service is to have a large number of service representatives 260 and a large number of call centers 258 standing by at all times to immediately handle any phone calls that come in describing problems with the service being provided. Unfortunately, creating call centers 258 costs money, since telephone lines, desks, and office space needs to be provided. In addition, each call service representative 260 requires training as well as continued pay and benefits for providing the customer support. It is therefore desired to provide highly qualified and well-trained customer service representatives 260 but to ensure that they only deal with the major problems which cannot be solved by other techniques as described herein according to the various embodiments.

Further, one function of the subscriber support system 250 is to proactively monitor the health of the subscriber's installed equipment, including relevant pieces of the receiver system 200 and, upon recognizing potential weak points or breaking points in the system, carry out the repair of such items prior to them going out of service or notify the user to take certain steps to avoid the components from going out of service so that they are replaced and repaired without an interruption to the subscriber's 224 service. Accordingly, the health server 254 will monitor many components in the content receiver system 200, continuously evaluate their health and performance, and store maintenance and system health records in a health server database.

If some part of the system is in need of repair, the health server 254 can be configured to send a notice to the customer service technicians so that they can be prepared to take action in the event the system deteriorates and a repair is needed. Further, the health server 254 will send a notification to the IVR system 256 to alert the IVR system 256 to potential problems which may be likely to occur in the content receiver system 200. The IVR system 256 will therefore be preloaded with information about the health and operation of each individual subscriber's content receiver system 200, prior to receiving a service call from the subscriber 224.

When the subscriber 224 calls about his particular content receiver system 200, the IVR system 256, upon identifying the customer, will then be routed to that particular subscriber's equipment health status as stored in the database and provided by the health server 254. The IVR system 256 will therefore first provide to the subscriber 224 those questions or data which directly relate to the most vulnerable parts of the system for which the health server 254 has reported are potential problems. Rather than having to respond to a large number of interactive computer voice messages, the subscriber will be provided with information concerning parts of his system that are vulnerable to disruption or in need of repair, and to more quickly remedy his situation. This will be a significant benefit to the subscriber 224 because IVR queries, in which a computer is responding to the caller's voice, will be tailored to those points of most interest to the health of the equipment installed in his home. The IVR system 256 can therefore assist the subscriber 224 in solving the problem without having to transfer the telephone call to the call center 258 and thus take the time of a customer service representative 260.

Further, since the IVR system 256 has been loaded in advance with the specific health history of the subscriber 224's equipment, if, after the initial queries to the subscriber 224 regarding the operation of this system, the IVR system concludes that a customer service representative 260 is needed, the transfer can occur very quickly, after just one or two interactions with the subscriber 224, rather than taking several minutes of the subscriber 224 having to work their way through a series of voice computer interaction messages. This will therefore provide a quicker customer response for each customer. In the event the response cannot be immediately provided via the computer system, the subscriber 224 is quickly transferred to a human customer service representative 260 who is able to look at the health history via his computer system and display monitor, since he will have full access to the health server database 254 as well as the interaction with the IVR system 256, and thus immediately help the subscriber 224 solve the problem.

Particular parts of the content provider support network 250 will now be described with respect to some of the following figures. Some of the individual components are known in the art, for example the set top box 202, a telephone network 263, the Internet 252, and an IVR system 256. However, within the structure of the present invention, the health server 254 is integrated with these system components in order to provide additional data so that each component interacts differently with the subscriber 224 than was possible in the prior art. Furthermore, the health server 254 provides additional stored data at various locations within the system, such as at the IVR system 256 and in the call center 258 including a computer database that is accessible by the customer service representative 260 in order to much more quickly identify potential issues in the individual subscriber 224's content receiver system 200.

Figure 2:
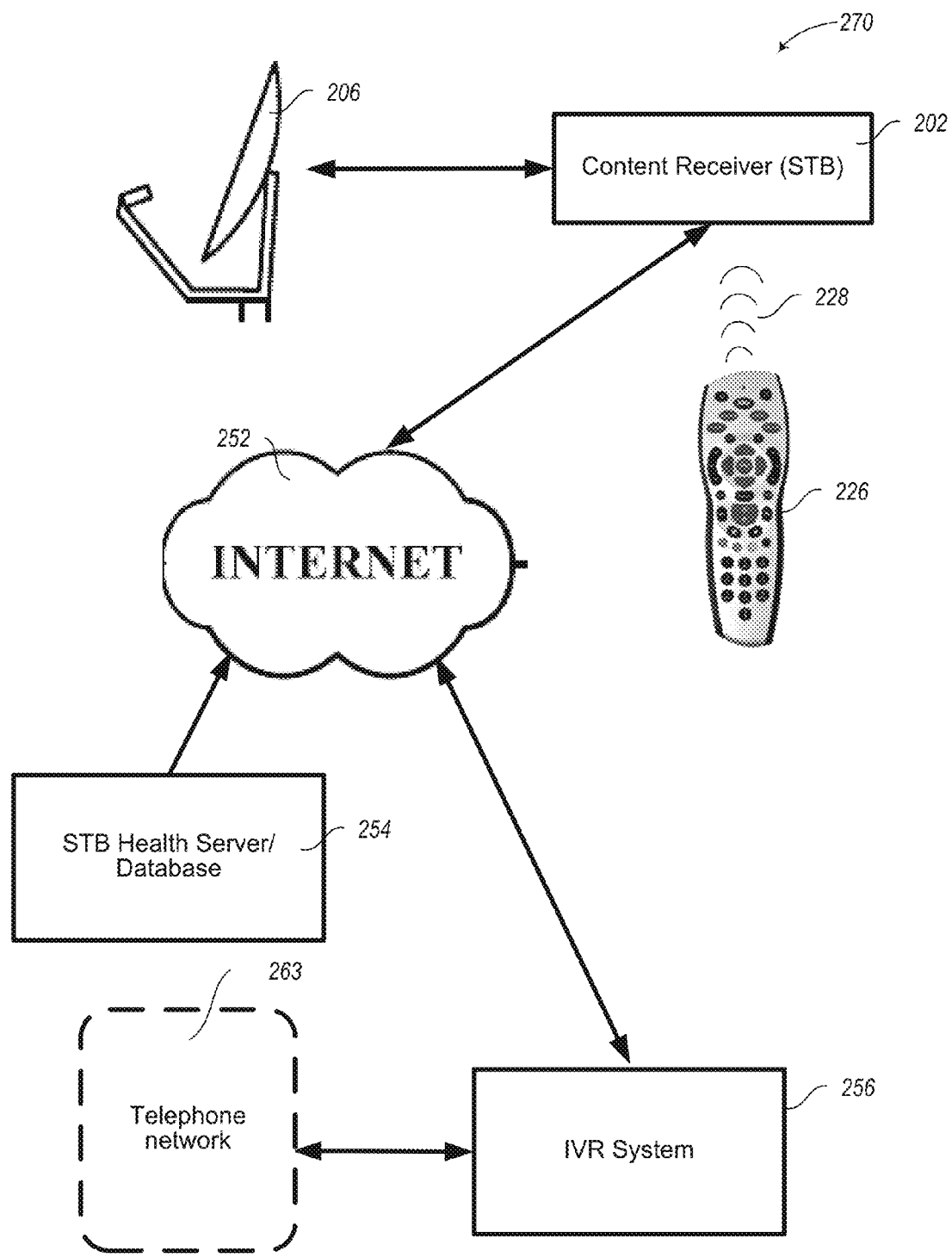
FIG. 2 is a block diagram showing components of a customer service call routing system, according to one embodiment described herein.

FIG. 2 shows components of a customer service routing system 270, according to one embodiment as described herein. The customer service routing system 270 includes some, but not all of the components of the content receiver system 200 and the content provider support network 250. Generally, the customer service routing system 270 includes components from the content receiver system 200 that are supplied to the subscriber 224, referred to herein as installed equipment. The installed equipment is maintained by the content provider, and therefore can be monitored by the content provider to reveal error conditions or status flags. Such components can include, for example, the content receiver, or set top box 202, the remote control 226, communication links 208 and 210, and the satellite receiving antenna 206. The customer service routing system 270 further includes a subset of components of the content provider support network 250 such as the IVR system 256 and the health server 254 that can function without the call center 258 having to spend time communicating with the user. The IVR system 256 includes an internal database that stores instructions for answering telephone calls and gathering information from the caller by executing interactive telephone scripts. The customer service routing system 270 is thus a system made up of existing components in the subscriber service arrangement such as, but not limited to, the satellite subscription service environment shown in FIG. 1 but with additional software and/or additional servers.

The health server 254 continuously collects data on the health of installed components within the content receiver system 200, and stores the data in its local database, as described later herein. This health data can be collected via an Internet connection 252, which is coupled to the content receiver set top box 202 and also coupled to the remote control 226. It may also collect data via the telephone network 263. The health server 254 communicates with the IVR system 256 via the Internet 252, providing updates to the IVR system 256 on the health of the system. The health server 254 also assists the IVR system 256 in sorting the queries that it presents to a user when he contacts the customer call line. With input from the health server 254, the automated IVR system 256 selects those questions for a specific customer which are mostly likely specifically related to his system. Accordingly, when the customer places a phone call that reaches the IVR system 256 via the telephone network 263, the health server 254 has preloaded in advance the complete health status of that particular subscriber system and matched it to the subscriber's identification, such as the subscriber's phone number, their address, their subscription details, and the like. Accordingly, once the IVR system 256 recognizes the phone number from which the call was placed, it can automatically locate the subscriber's record and match the health history of that particular content receiver system 200 which has been provided by the health server 254.

The health server 254 can actively collect data on all aspects of the content receiver system via continuous monitoring during its entire operation. For example, it will monitor the strength of the signal received by the satellite receiving antenna 206 and passed to the set top box 202. It may also receive weather reports regarding the weather conditions for that particular subscriber, and store this as live content in order to recognize whether heavy rain, snow, or wind conditions may be affecting the receipt of a satellite signal at the receiving antenna 206. It will also monitor and compare the strength of the signal received by receiving antenna 206 with the strength of the signal received by the set top box 202 in order to determine whether there is a weak signal received by the set top box 202 even when a strong signal came to the receiving antenna 206, and thus recognize in advance the potential for some type of loose wire, worn wire, or a potential for a hardwire defect between the receiving antenna 206 and the set top box 202. The health server database 254 will also continuously monitor all aspects inside the content receiver set top box 202, which has a number of components that are described in more detail in FIGS. 3 and 4. While such set top box contents are known in the art, one of the new techniques provided by the embodiments described herein is the organization of equipment health data in a way to most effectively assist a subscriber 224 while engaging with the IVR system, to solve the problem quickly and seamlessly, so that the satellite service to the subscriber 224 is interrupted only briefly and then quickly restored.

The health server 254 also monitors the condition and operation of the remote control 226. Since the remote control 26 interacts with the set top box 202 via link 228, the health and operation of the communication link 228 can be monitored as well as the battery strength, the keyboard functions, and other operations of remote control 226. Such operational data is continuously checked and stored in the health server 254, and then organized in advance on an active basis prior to a problem occurring, in order to identify the likelihood that a problem may occur in one particular part of the system, recognize the criticality of such a problem, and determine solutions to such potential problems. The health server 254 may proactively send a signal to the IVR system to prompt the subscriber to take a certain action, for example to inspect the hardwire cable between the receiving antenna 206 and the content receiver 202, or to check the hard drive in the set top box to determine if it has been bumped or jarred, and should be rebooted or replaced.

As one example, the health server 254 may receive a signal if the content receiver 202 is dropped from over a certain height, for example more than two feet, based on monitors that may be placed therein, such as an accelerometer or other MEMS device. It may also recognize the content receiver 202 being impacted. Upon detection of an impact or drop event, the health server 252 can pre-load the IVR system 256 with an alert signal that, for example, while the DVR 306 within the set top box remains operational, the DVR 306 has been jarred and may have suffered damage. The alert can further advise the subscriber to take more care in the future, or potentially to replace the DVR 306 in the coming weeks so as to avoid complete loss of all data and the inability to recover previously recorded programs, which could have been transferred to a new DVR 306 had the transfer occurred before complete breakage of the current DVR. When the subscriber calls the customer service line, the alert can be conveyed to the subscriber by the IVR system.

Following, a more detailed description of specific components within the system will be described, some of which are known in the art and others of which are novel, the combination of the entire system providing significant advantages for the subscriber 224 in maintaining full functioning of his content receiver system 200.

Figure 3:
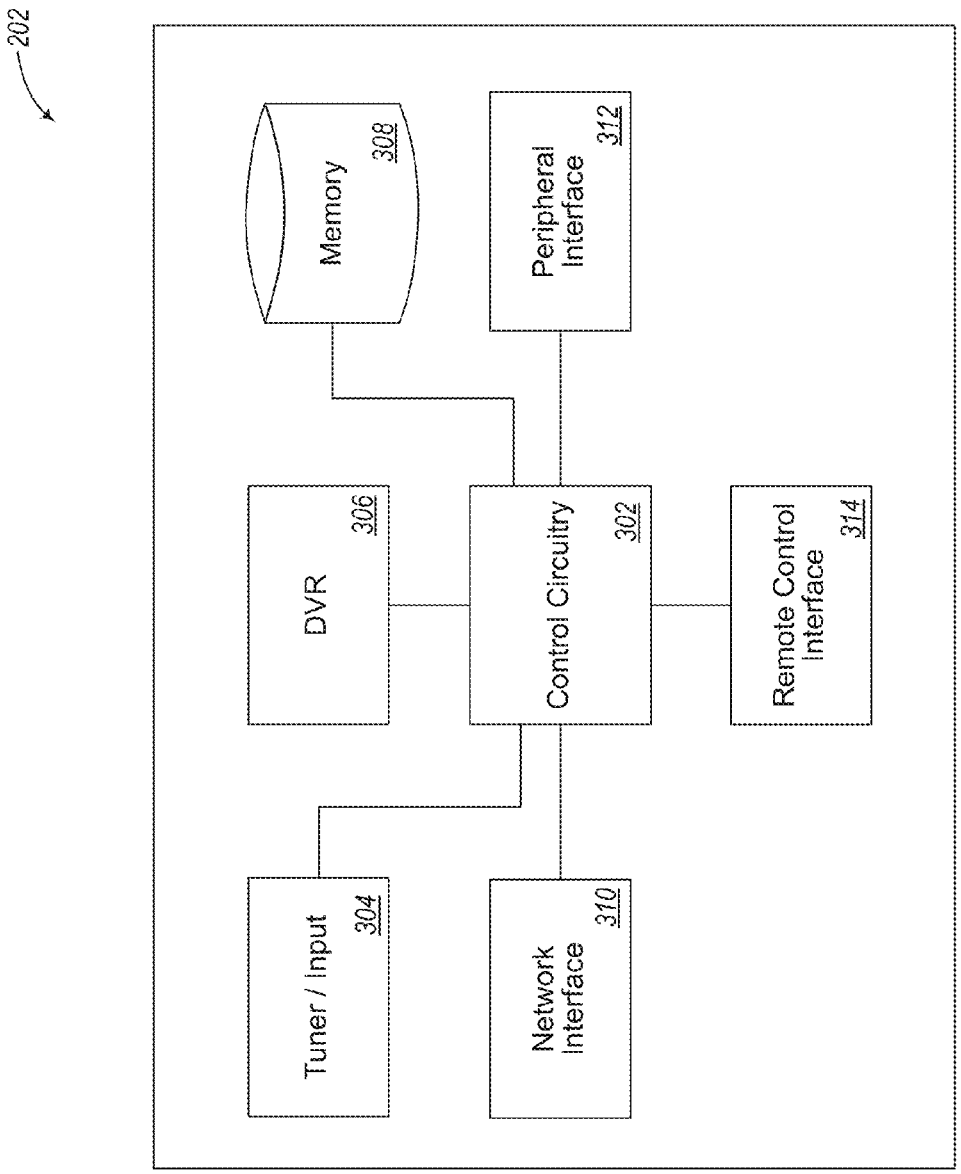
FIG. 3 is a block diagram showing components of a typical set top box, according to the prior art.

FIG. 3 shows components of a typical set top box 202, that is used in combination with an embodiment of the present disclosure. Components of the set top box 202 include control circuitry 302, one or more tuning devices 304, an optional internal digital video recorder (DVR) 306, a memory 308, a network interface 310, a peripheral interface 312, and a remote control interface 314.

Generally, the set top box 202 can receive one or more television signals from a media provider such as a cable television distributor, a broadcast television distributor or a satellite television distributor. In the embodiment shown, the content receiver system 200 receives signals from a satellite television distributor via the satellite set top box 202. One skilled in the art will recognize that set top box 202 can also receive video-digital subscriber line (DSL), DSL, Internet, wireless and other signals from content or video distributors. The satellite set top box 202 can process television signals and can send the processed signals to peripheral electronic devices, such as the display 204 and the remote control 226. The satellite set top box 202 also can accept commands from the remote control 226 or other peripheral electronic devices. More detail about the functionality of the satellite set top box 202 is provided below. One skilled in the art will recognize that many embodiments of the content receiver system 200 are possible and within the scope of this disclosure. Other such embodiments can include, but are not limited to, various combinations or permutations of devices and connections for the delivery, storage, and display of communications, content and other data.

In one embodiment, the set top box 202 receives media content from the satellite receiving antenna 206. The tuning device 304 tunes into a selected media channel received by the satellite receiving antenna 206 to acquire a satellite signal. The tuning device 304 can initially process the satellite signal. The tuning device 304 can also receive subscriber commands in the form of signals from the control circuitry 302. Signals from the control circuitry 302 can include, but are not limited to, a signal to tune to a transponder as part of the process of selecting a certain channel for viewing on a peripheral device. The tuning device 304 transmits the acquired satellite signal to the control circuitry 302 where the signal can undergo extensive signal processing.

Furthermore, the set top box 202 can include multiple tuning devices 304. This allows the set top box 202 to record two or more programs that air simultaneously. Generally, the set top box 202 can record one show at a single time for each tuning device 304 that the set top box 202 includes. For example, if the set top box 202 includes two tuning devices 304, then the set top box 202 can record two media programs simultaneously. Thus if there is a recording conflict between two programs, the set top box 202 can still record both programs because it has two tuners. If a recording conflict occurs because the number of tuning devices 304 is less than the number of programs that the subscriber 224 wants to view or record, the control circuitry 302 can be programmed to resolve the conflict by prioritizing certain media content according to the subscriber's directions, or automatically, based on various criteria.

A first step in signal processing by the control circuitry 302 can include, for example, demodulating the satellite signal. Further signal processing can include error checking. One skilled in the art will recognize that systems with analog data or combined analog and digital data are also possible and contemplated herein.

The DVR 306 can be used to record programs locally in the set top box 202. For example, while viewing the programming guide the user may notice a TV show that is not broadcast at a convenient time. By using the remote control 226 the user can command the set top box 202 to record the TV show to the DVR 306 so that the user may view the TV show at a later convenient time. When the user selects a program to be recorded to the DVR, the set top box 202 sets a recording timer that causes the set top box 202 to automatically record the selected program at the scheduled time. At a time convenient to the user, the user can operate the remote control 226 to cause the set top box 202 to display a list of programs that have been recorded to the DVR. The user can select the desired program from the list of recorded programs and the set top box 202 will play back the selected program.

Alternatively, the set top box 202 may access, via the Internet 252, recorded programs stored on a remote storage device. In this case, when the user of the set top box 202 selects a media program to be recorded, the media program is recorded to remote storage instead of to the DVR 306 inside the set top box 202. The user of the set top box 202 can schedule media program recordings by accessing the Internet 252 through a smart phone, a PC, a tablet, a laptop, or other suitable means. The user can log into an account associated with the set top box 202 and can schedule recordings via the Internet 252. The media programs can be viewed by connecting the set top box 202 to the Internet 252 to access the remote storage device.

As the user selects multiple programs to be recorded to the DVR 306, it is possible that two or more of the media programs will have a time conflict in their scheduled air times. When the set top box 202 determines that there is a time conflict between two media programs which are both scheduled to be recorded, the set top box 202 follows a particular protocol to automatically assign respective priority levels to the two media programs. The media program that has a higher priority will be recorded at the expense of the media program that has the lower priority if the conflict cannot be resolved. The set top box 202 can store in the memory 308 instructions that operate the DVR 306 according to such a protocol.

The satellite set top box 202 can be connected to the display 204 and the peripheral devices 220 through a peripheral interface 312. Such peripheral devices can send and receive signals to and from the satellite set top box 202. For instance, a television can receive video and audio signals, whereas a stereo can receive only audio signals. A camcorder, on the other hand, can send video or audio signals to the satellite set top box 202 or receive audio and video signals from the set top box 202 to record. As another example, the peripheral interface 312 can include a processor or other electronic components to permit an interface to content security devices such as an external smart card. The peripheral interface 312 can then encrypt or decrypt content for output to other peripheral devices. Thus, the peripheral interface 312 can perform one or more functions for multiple peripheral devices, including, but not limited to, the synchronous or asynchronous transfer of data between different peripheral devices (e.g., decrypting content using a smart card peripheral device and outputting decrypted content to a television at the same time). One skilled in the art will recognize that the peripheral devices can include many types of commercially available electronic devices.

Another peripheral device and connection to the satellite set top box 202 can include a phone line and modem. Set top box 202 can use a modem and phone line to communicate with one or more outside entities or systems (e.g., satellite television distributor). The phone line can carry local or long-distance telephone service. One skilled in the art will recognize that the phone line can also carry other services, including, but not limited to, DSL service. These communications can include requesting pay-per-view programming, reporting of purchases (for example, pay-per-view purchases), obtaining updates to subscriber programming (e.g., updating EPG data), or receiving updates to software on the satellite set top box 202. For example, the phone line can communicate with the satellite set top box 202 using an RJ-11 style telephone connection. One skilled in the art will recognize that there are many other uses for this phone line connection. For example, EPG data can be transmitted to set top box 202 via phone line or in the medial signal 201. One skilled in the art will recognize that the EPG data can be transmitted to set top box 202 by various other methods, systems and outside entities. Also, one skilled in the art will recognize that a phone line connection to the media service provider can represent other communication connections, including, but not limited to, wireless, Internet, or microwave communications connections. Another function of the phone line can be to periodically receive the EPG data. One skilled in the art will also recognize that a phone line connection can permit networked communications with other network-ready devices using the telephone wiring within a subscriber's location.

The network interface 310 provides network connectivity, for example, to the Internet via a wireless router or a local area network. The peripheral interface 312 can include components that permit connection of RJ-45 network cabling and transmission of TCP/IP traffic to other connected devices. As another example, a wireless router can be attached via the peripheral interface 312 to allow wireless local-area-network (WLAN) data communications using a standard wireless networking protocol such as WiMAX, 802.11b or 802.11g. One skilled in the art will recognize that various other network connections to the set top box 202 are possible.

The remote control interface 314 includes instructions that allow a user to communicate with the satellite set top box 202, and can be implemented using the peripheral interface 312 or by connecting a separate remote control interface device. The remote control interface 314 can translate an input from the user into a format understandable by the control circuitry 302. The remote control interface 314 can thus be considered a user interface (UI). The translation systems can include, but are not limited to, electronic receivers and electronic relays. The remote control interface 314 can receive commands from more than one remote control 226. The remote control 226 can use infrared, UHF, or other communications technology. One skilled in the art will recognize that other means to receive and translate user inputs are possible.

Any one of the hardware components or associated software described above with reference to FIG. 3 can be monitored by the health server 254 for signs of failure or faulty operation. Any monitor data stored in the health server database can then be forwarded to the IVR system 256 for use in responding to a customer service call.

Figure 4:
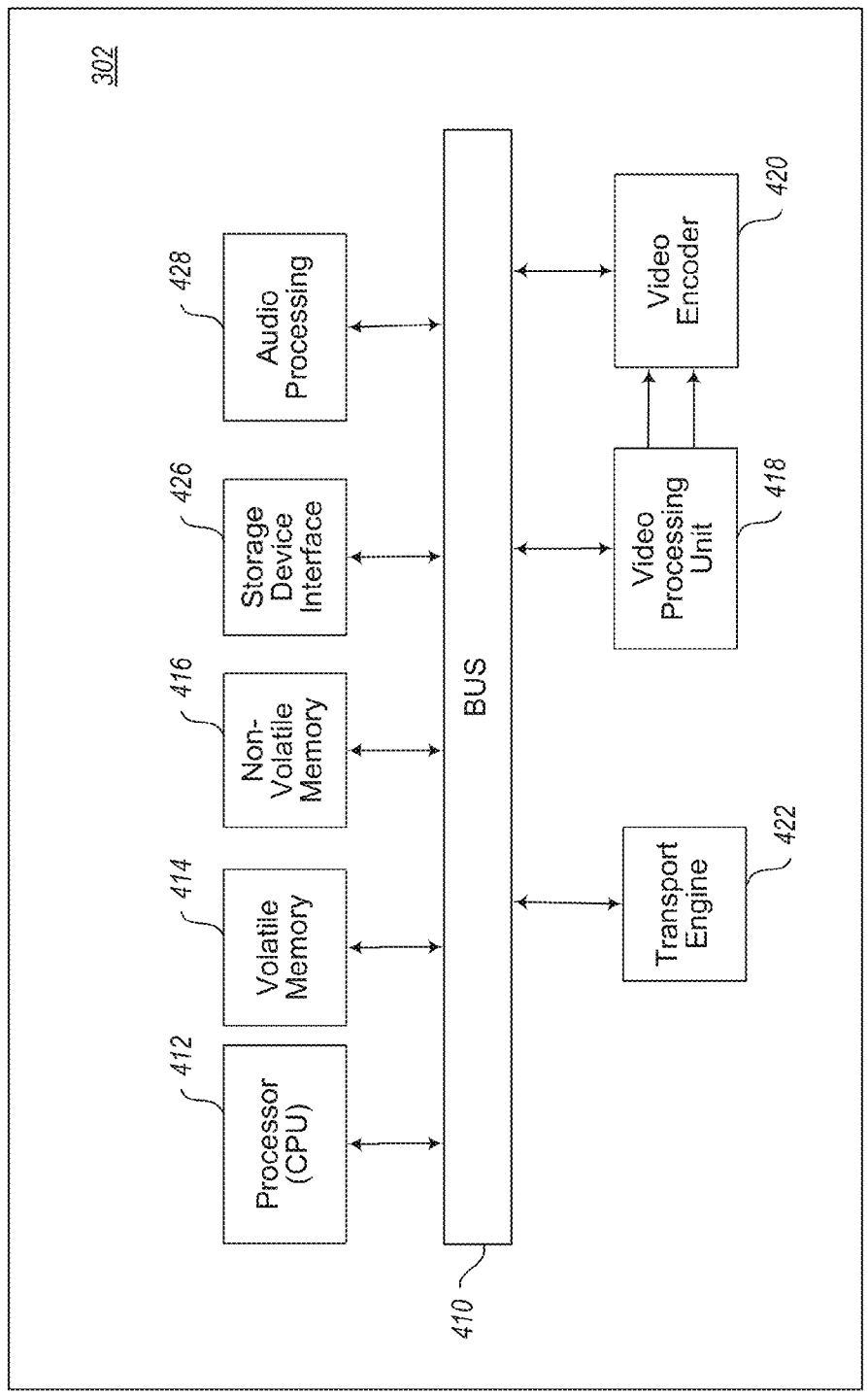
FIG. 4 is a block diagram showing exemplary control circuitry components within the set top box shown in FIG. 3, according to the prior art.

FIG. 4 shows an exemplary embodiment of the control circuitry 302 in the form of a set top box decoder, such as, for example, the STi5517 Low-Cost Interactive Set top box Decoder, Part No. 7424736A, available from STMicroelectronics, Inc. In this embodiment, the control circuitry 302 includes discrete electronic components combined into a single circuit with a shared bus 410. In other embodiments, the control circuitry 302 can be configured differently. For example, one or more of the control circuitry 302 components in set top box 202 can be combined or omitted. As a further example, one or more of the control circuitry 302 components in the set top box 202 may not share the bus 410, but may nonetheless be operatively connected by some other means. One skilled in the art will recognize that other configurations of the set top box 202 and the control circuitry 302 are possible and within the scope of this disclosure. One skilled in the art will further recognize that some components of the set top box 202 and the control circuitry 302 can be implemented in hardware or software. The control circuitry 302 can operate under the control of software, firmware, or some other instructions stored in memory or control logic. One skilled in the art will also recognize that the control circuitry 302 may include other electronic components or structures to mediate or process signals.

The control circuitry 302 includes one or more processors such as a central processing unit (CPU) 412. In one embodiment, the control circuitry 302 contains a single CPU 412 that is operatively connected to the shared bus 410. The CPU 412 may execute logical operations to execute functions of the set top box 202 including, but not limited to, channel selection, recording control, EPG display and control and system maintenance. Examples of commercially available CPUs 412 include the STMicroelectronics Enhanced ST20 32-bit VL-RISC, or Intel Xeon or Atom series processors that are designed or adapted for servers. One skilled in the art will recognize that the CPU 412 may be integrated with memory or other discrete electronic components. The control circuitry 302 may further include a custom application-specific integrated circuit (ASIC) chip, such as from the LSI Logic G11 family, or FPGA, such as from the Altera Stratix™ family. Alternatively, a microcontroller can be substituted for the CPU 412. Microcontrollers generally include, in addition to a CPU, extra program memory such as read-only memory (ROM), and input/output (I/O) functionality.

The control circuitry 302 further includes one or more volatile memory components 414. Volatile memory components 414 may include, but are not limited to, one or more SDRAM memory chips. Similarly, control circuitry 302 may also contain one or more non-volatile memory 416. Non-volatile memory 416 may include one or more memory chips, including, but not limited to, ROM, SRAM, SDRAM and Flash ROM. One skilled in the art will recognize that volatile memory 414 and non-volatile memory 416 may be integrated within other electronics components. One skilled in the art will also recognize that other memory components may be included within set top box 202 and control circuitry 302. One skilled in the art will recognize that memory 414, 416 may be used for many purposes, including, but not limited to, storing EPG data and storing data for use by CPU 412.

In one embodiment, the satellite signal 201 is in digital form, for example, a digital stream, after demodulation and error correction. The digital stream may use, for example, the digital video broadcasting (DVB) transport standard. The digital stream may be multiplexed and therefore require demultiplexing by a transport engine 422. Demultiplexing, or demuxing, may include separating the digital stream into separate digital data streams. The digital streams may be packetized such that the multiplexing of separate digital data streams is accomplished packet-by-packet instead of bit-by-bit. The packet size may be constant or variable. After demuxing, the separate digital data streams may be reassembled by placing related packets together in a continuous data stream. Each of the separate digital data streams may also be encoded. Encoding is a method for representing data. Encoding may allow the data to be compressed to provide the system with increased bandwidth. One skilled in the art will recognize that several different encoding formats are possible. In satellite television, encoding formats may include the MPEG, MPEG2 or MPEG4 standards. In addition to raw data, the separate digital data streams may include forward error correction, headers, checksums, or other information. Such information may be included in a digital television signal that is transmitted by the communication link 208 and processed by the satellite set top box 202.

The control circuitry 302 may include one or more video processing units 418 that, among other video processing operations, may decode the encoded digital television signal. In this embodiment, the video processing units 418 may include, but is not limited to, a graphics processor, MPEG-2 decoder and a display compositor with separate on-screen display (OSD) control for peripheral devices. One skilled in the art will recognize that the video processing units 418 may also include other electronics, including, but not limited to, alpha blending, antialiasing, anti-flutter and anti-flicker filters, memory, and video-rendering components.

The control circuitry 302 may further include a video encoder 420. The video encoder 420 may work in combination with, or independently from, the video processing unit 418. The video encoder 420 may encode a digital stream for output to one or more peripheral devices, including, but not limited to, a television. For example, the video encoder 420 may encode the digital stream for RGB, CVBS, Y/C and YUV outputs. Encoding may allow program data to be compressed. In this embodiment, the video encoder 420 may translate the digital stream into a signal using the NTSC, PAL or SECAM standards. One skilled in the art will recognize that the video encoder 420 may include other functionality, may be integrated into other electronic components of the set top box 202, and may encode digital stream in accordance with other standards.

The control circuitry 302 may also include one or more storage device interfaces 426 that couple the control circuitry 302 to storage devices such as the DVR 306 and the memory 308. The DVR 306 may be used for many purposes, including, but not limited to, storing recorded programs and buffering currently playing programs (e.g., buffering a program may allow a user to pause or rewind a program).

The memory 308 can be used for many purposes, including, but not limited to storing programming data, storing commands or functions for the control circuitry 302, storing timers or record events, and storing data for other devices within or connected to the satellite set top box 202. In one embodiment, the memory 308 provides the long-term storage functionality of the STB (i.e., records and stores persistent recordings and may also include operating system software and other data or software necessary to the STB 202) and the DVR 306 provides short-term storage functionality (i.e., records and stores temporary recordings).

The memory 308 can be, for example, an 80 GB 'Winchester' hard drive connected to the control circuitry 302 via a standard IDE/EIDE interface cable. As another example, the memory 308 may be used to temporarily store data for processing by the CPU 412. In one example, the memory 308 may allow the CPU 412 to separate electronic programming guide data arriving as part of the digital stream. One skilled in the art will recognize that other storage devices and interfaces may be substituted for those shown and described herein while still remaining within the scope of this disclosure. One skilled in the art will also recognize that the storage device interface 426 and associated storage devices may separately or together include an integrated memory (e.g., a memory buffer, commonly referred to as cache) and additional processing components or logic. One skilled in the art will also recognize that the storage device interface 426 may be integrated into a peripheral interface 312 (described below). Finally, one skilled in the art will recognize that the memory 308 may be external and connected to the set top box 202. For example, an external hard drive may be connected to the set top box 202 using USB 2.0 or IEEE 1394 (FireWire) connections. Such an external hard drive may include a screen for portable viewing of programming stored on it. Furthermore, such a storage device can contain expansion slots, such as IDE connections, for the provision of additional storage devices to provide additional capacity at a later time. The design and operation of hard drives and similar devices are well known in the art and need not be described further here.

An audio processing unit 428 may also be part of the control circuitry 302. The audio processing unit 428 may decode the digital stream for output to peripheral devices, including, but not limited to, a stereo, television speakers or portable audio or video players. For example, the audio processing unit 428 may decode MPEG-1 layers I/II and layer III, Dolby Digital, Dolby ProLogic, SRS/TruSurround encoded audio in the digital stream. The audio processing unit 428 may include one or more processors, memory components or digital to audio converter (DAC) systems. One skilled in the art will recognize that other audio processing components and functionality may be accomplished using the audio processing unit 428.

Figure 5A:
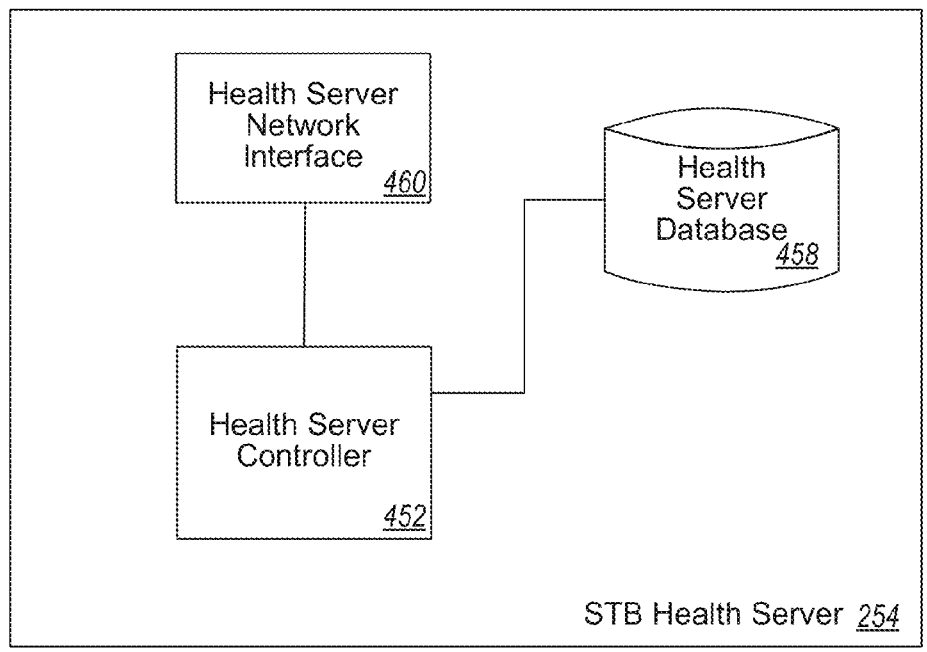
FIG. 5A is a block diagram of the health server shown in FIG. 2, according to an embodiment described herein.

FIG. 5A shows components of the equipment health server 254, according to one embodiment. Such components include a health server controller 452, a health server database 458, and a health server network interface 460. Part or all of the equipment health server 254 can be co-located at the call center 258, or portions can be distributed to multiple locations. For example, the health server controller 452 can be located at the call center 258, while the health server database 458 can be hosted remotely by a cloud-based data storage service. Or, the STB health server 254 can be hosted at a server farm as a cloud-based system. Communication between the equipment health server 254, the IVR system 256, and the call center 258, or between distributed parts of the equipment health server 254 such as between health server controller 452 and the health server database 458 is generally supported by local wired connections to the Internet.

The health server controller 452 can include discrete electronic components combined into a single circuit with a shared bus, thus having a similar structure to that of the set top box 202, as shown in FIG. 4. Or, one or more of the health server controller 452 components may not share the bus, but may nonetheless be operatively connected by some other means. One skilled in the art will recognize that other configurations of the health server controller 452 are possible and within the scope of this disclosure. One skilled in the art will further recognize that some components of the health server controller 452 can be implemented in hardware or software. The health server controller 452 can operate under the control of software, firmware, or some other instructions stored in memory or control logic. One skilled in the art will also recognize that the health server controller 452 may include electronic components or structures to mediate or process signals.

The health server controller 452 includes one or more processors such as a central processing unit (CPU). In one embodiment, the health server controller 452 contains a single CPU that may be operatively connected to a shared bus. The CPU may execute logical operations to carry out functions of the equipment health server 254 including, but not limited to, management of the health server database 458, executing searches of the health server database 458, transmitting database queries, extracting data from the health server database 458, analyzing the extracted data, performing comparisons, and relaying status messages. The health server controller 452 may further act as a network controller through the health server network interface 460. Examples of commercially available CPUs include the STMicroelectronics Enhanced ST20 32-bit VL-RISC, and Intel Xeon or Atom series processors. One skilled in the art will recognize that the CPU may be integrated with memory or other discrete electronic components. The health server controller 452 may further include a custom ASIC, such as from the LSI Logic G11 family, or FPGA, such as from the Altera Stratix™ family.

The health server controller 452 further includes one or more volatile memory components. Volatile memory components may include, but are not limited to, one or more SDRAM memory chips. Similarly, the health server controller 452 may also contain one or more non-volatile memory components. Non-volatile memory may include one or more memory chips, including, but not limited to, ROM, EEPROM, NAND Flash, and Flash. One skilled in the art will recognize that volatile memory and non-volatile memory may be integrated within other electronics components. One skilled in the art will also recognize that other memory components may be included within the health server controller 452. One skilled in the art will recognize that memory may be used for many purposes, including, but not limited to, storing EPG data and storing data for use by the CPU.

The health server database 458 can be used for many purposes, including, but not limited to storing programs, commands, or functions for execution by the health server controller 452, storing subscriber equipment configuration information, subscriber equipment data, repair records pertaining to subscriber equipment, maintenance logs, installation logs, spare parts orders and inventories; timers or record events, and storing data for other devices within or connected to the customer service routing system 270. In one embodiment, the health server database 458 provides the long-term storage functionality of the equipment health server 254 (i.e., records and stores persistent recordings and may also include operating system software and other data or software necessary to the equipment health server 254).

The health server database 458 can be, for example, an 80 GB 'Winchester' hard drive connected to the health server controller 452 via a standard IDE/EIDE interface cable. As another example, the health server database 458 may be used to temporarily store data for processing by the health server controller 452. One skilled in the art will recognize that other storage devices and interfaces may be substituted for those shown and described herein while still remaining within the scope of this disclosure. Further, the health server database 458 and associated storage devices may separately or together include an integrated memory (e.g., a memory buffer, commonly known referred to as cache) and additional processing components or logic. Finally, the health server database 458 may be external and connected to the equipment health server 254. For example, an external hard drive may be connected to the equipment health server 254 using USB 2.0 or IEEE 1394 (FireWire) connections. Such an external hard drive may include a screen for portable viewing of programming stored on it. Furthermore, such a storage device can contain expansion slots, such as IDE connections, for the provision of additional storage devices to provide additional capacity at a later time. The design and operation of hard drives and similar devices are well known in the art and need not be described further here.

Figure 5B:
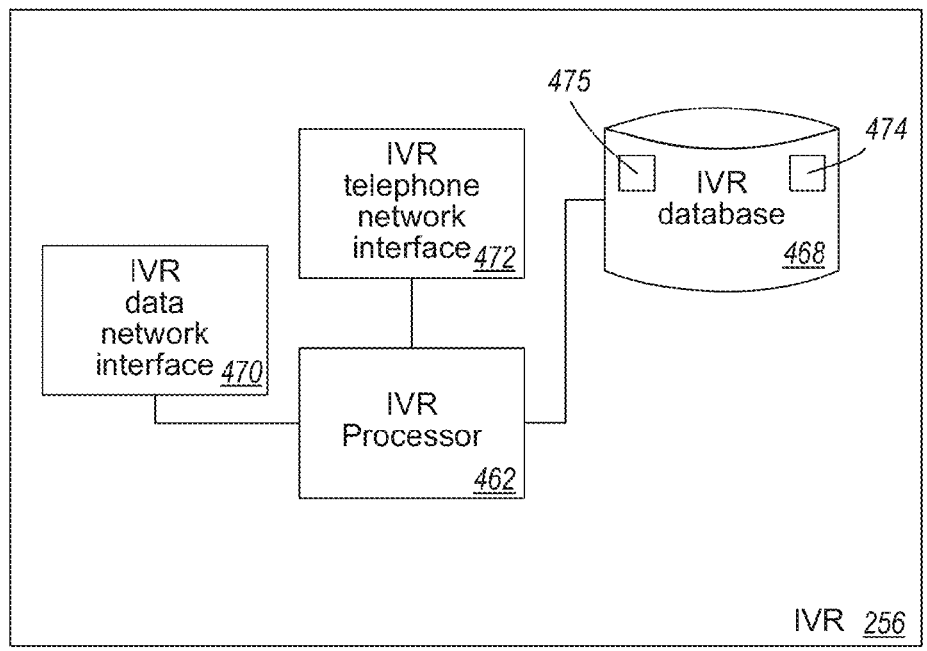
FIG. 5B is a block diagram of the interactive response system shown in FIG. 2, according to an embodiment described herein.

FIG. 5B shows components of the IVR system 256, including an IVR processor 462, an IVR database 468, an IVR telephone network interface 472, and an IVR data network interface 470. Instructions for answering inquiries and executing interactive scripts 474, as well as control software 475, reside in the IVR database 468. The interactive scripts 474 and control software 475 can be executed by the IVR processor 462. Embodiments of hardware components within the IVR are similar to their counterparts shown in FIG. 5A and described above. Data transfer between the IVR system 256 and the health server database 458 is an inventive feature described herein, wherein such transfer of information is managed by the control software 475. In addition, the interactive scripts 474 that query the subscriber and deliver equipment health history and status information to the subscriber by telephone or computer display are also inventive elements as described herein.

Figure 6:
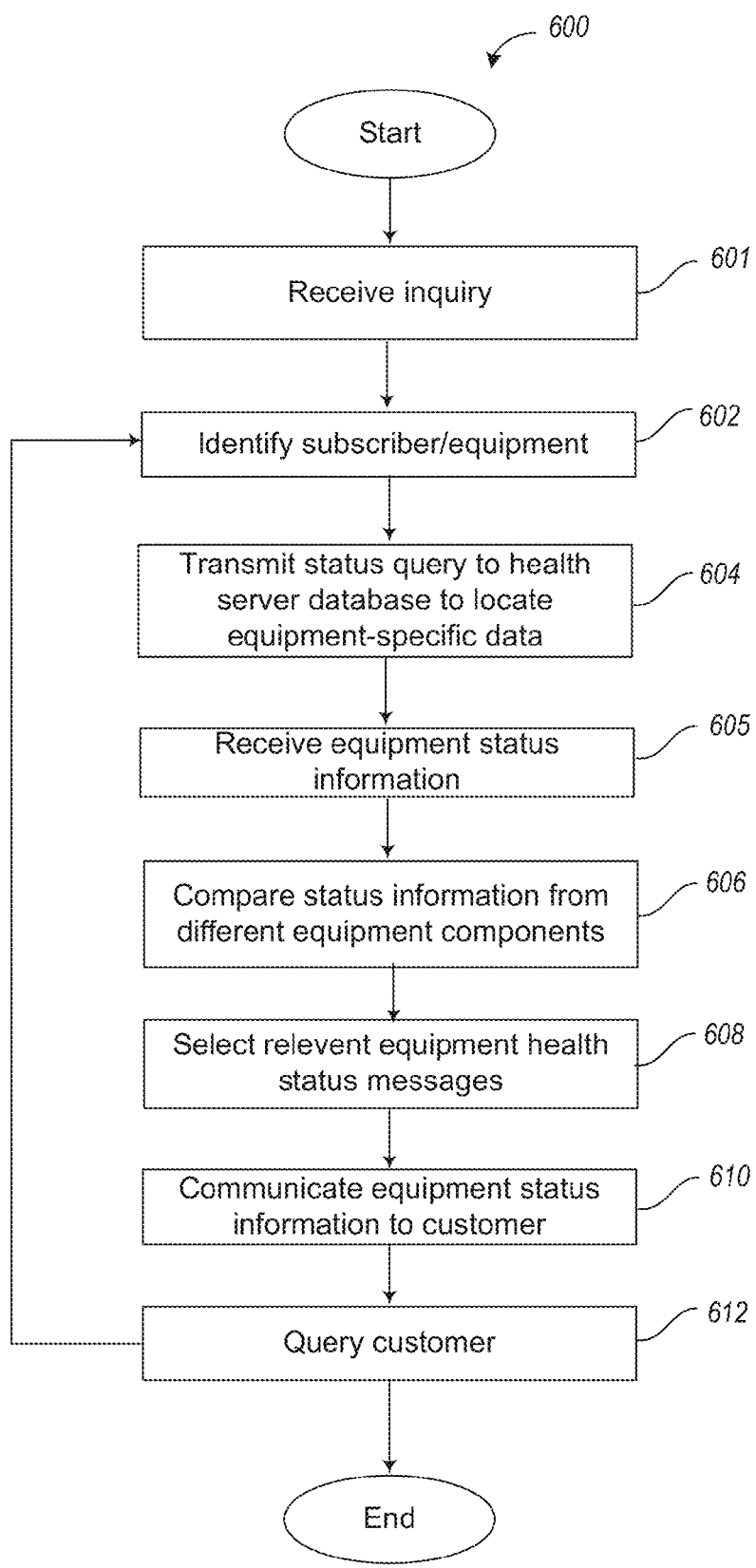
FIG. 6 is a flowchart showing a sequence of steps in an exemplary method of operating the customer service call routing system shown in FIG. 2, according to one embodiment described herein.

FIG. 6 illustrates one embodiment of a computer-implemented method 600 of operating the customer service routing system 270. The method 600 is carried out by the IVR system 256 and/or the health server 254 to support the content receiver system 200. The method 600 entails one or more microprocessors within the equipment health server 254 and/or the IVR system 256 executing instructions stored in the health server database 458 and/or the IVR system. Such instructions include the control software 475 and the interactive scripts 474 which communicate via telephone or computer with customers. Generally, the method 600 uses data stored in the health server database 254 to improve responsiveness of the IVR database 468.

The method 600 can be initiated upon receipt of a customer service inquiry at 601. The inquiry can be received as a telephone call via the IVR telephone network interface 472, or as an electronic message via the IVR data network interface. Alternatively, the method 600 can be initiated by the IVR system 256 as a periodic inquiry of the health of the subscriber equipment, in a proactive fashion so that if the subscriber calls, the IVR system 256 already has information ready to report. Alternatively, the health server 254 can catch a problem and proactively notify the subscriber that their equipment is not working efficiently. For example, if the strength of the media signal 201 is degrading gradually due to obstruction by the growth of trees or bushes near the satellite receiving antenna 206, the subscriber 224 may not notice; however, with monitoring, degradation in the media signal 201 can be flagged automatically as soon as the signal drops below a minimum allowed level. The status can then be communicated to the subscriber 224 via the IVR system 256.

At 602, equipment located at the residence of the subscriber 224 is identified. The subscriber equipment includes electronic devices such as the set top box 202, the remote control 226, the satellite receiving antenna 206 and the communication link 208 that are provided to the subscriber 224 by a service provider such as a satellite television distributor. Identification can be provided in the form of, for example, serial numbers associated with manufacture of each electronic device, or device numbers associated with the subscriber account. It is often the case that one subscriber account involves multiple set top boxes 202, so that identification information pertaining to each set top box 202 and all associated remote controls 226, for example, is provided.

Non-subscriber equipment such as the peripheral devices 220 and the display 204 are generally not monitored, or supported, by the service provider. Thus, an external hard drive or other DVR owned by the subscriber 224 would not be monitored or supported, whereas a DVR 306 that is internal to the set top box 202 would be monitored and supported. Therefore, it may be advantageous for the subscriber to obtain DVR functionality by adding the internal DVR 306 to the subscriber account rather than providing their own DVR device.

At 604, in response to a status query from the IVR system 256, one or more databases within the health server 254, and/or external databases, are searched for records pertaining to each element of the subscriber equipment identified at step 602. Such records can include, for example, model numbers, the original installation date, a health history of each of the set top box(es) 202, data or metadata relating to a failure mode, or trend data formed from a periodic status report taken from the set top box(es) at regular intervals such as daily or weekly, and a status of when the batteries were last changed in each of the remote control(s) 226. Metadata can be collected from external sources such as, for example, weather data stored on an Internet-accessible national weather database, which data is associated with a particular timestamp of a failure mode. Alternatively, updated status information can be gathered in real time from the identified equipment.

At 605, the database records and metadata are received by the IVR system 256.

At 606, if there are multiple set top boxes 202 at the subscriber location, data sets from the different pieces of equipment can be compared to one another to identify commonalties. For example, data collected from different set top boxes 202 at a common location can indicate a problem with the received satellite signal or the shared communication link 208. Additionally or alternatively, data from each device can be compared to an independent control standard. The independent control standard can be based, for example, on average data for a particular device model, or it can be derived from the past health history of a particular device.

At 608, status messages on file in the IVR database can be selected based on their relevance to the current operating state of the subscriber equipment. For example, if there is an original status message on file in the IVR database stating that remote control batteries were provided with the brand new remote control device on the equipment installation date, and the batteries have been changed three times since installation, then the original status message would not be selected. However, a status message describing a repair performed on the satellite dish at the same residence last week would be a relevant status message to select.

Preferably, the IVR database has been previously supplied with the full health status report from the health server 254. Accordingly, at step 608 those status messages which are most relevant to that particular subscriber system can be immediately provided to the subscriber 224. This will provide a much more friendly user interface and in many instances completely solve the subscriber's questions via computer interaction without requiring a human customer service representative 260. Thus, in some embodiments, providing the relevant status messages and the interaction with the subscriber at step 608 will be sufficient to solve the problem, and the service call can be concluded via interaction between the customer and the IVR system itself. In some embodiments, the subscriber 224 may wish to advance to a further stage which requires even more interaction with the service provider, and thus advances to further transmissions of the status information in box 610, as will now be described.

At 610, once the relevant status data has been assembled for a particular subscriber location, a health status report can be relayed to the service provider client automatically. The service provider can then evaluate the status data against any reported failure mode to further narrow down a potential root cause of the failure. In some instances, the service provider may proactively send a signal to the subscriber that certain steps need to be taken at the local set top box in order to maintain the health of the system. Alternatively, the service provider may proactively send a notice to a technician, who will visit the subscriber and perform the repair prior to being officially called, and therefore avoid any down time in the system at all. The health status report can be especially useful, for example, when there is a lack of continuity among service technicians addressing repeat failures. For example, with the current inventive system, a new technician will learn that a suspect part has already been replaced several times recently by other technicians, and thus conclude that the first identified part is not actually the problem, rather, there may be a short circuit causing a repeat failure of the same part, for example. Whereas, if a health status report was not available, the root cause of the current subscriber equipment problem might be easily overlooked, and the same part might be replaced again and again.

Figure 7A:
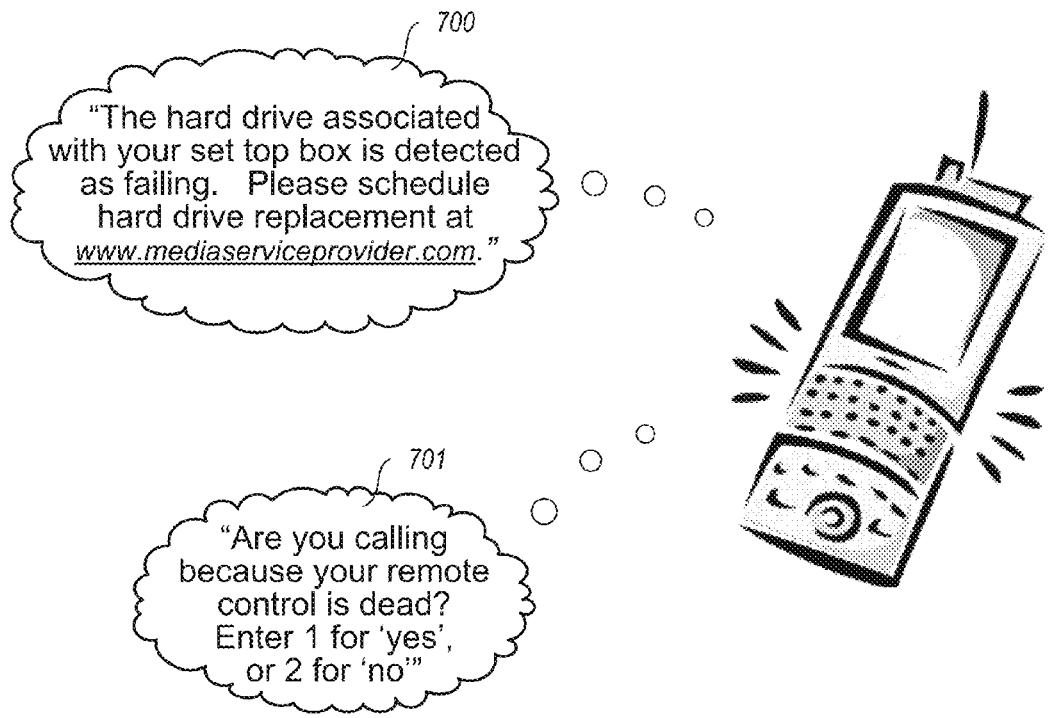
FIGS. 7A and 7B show exemplary alert messages communicated to a subscriber.
Figure 7B:
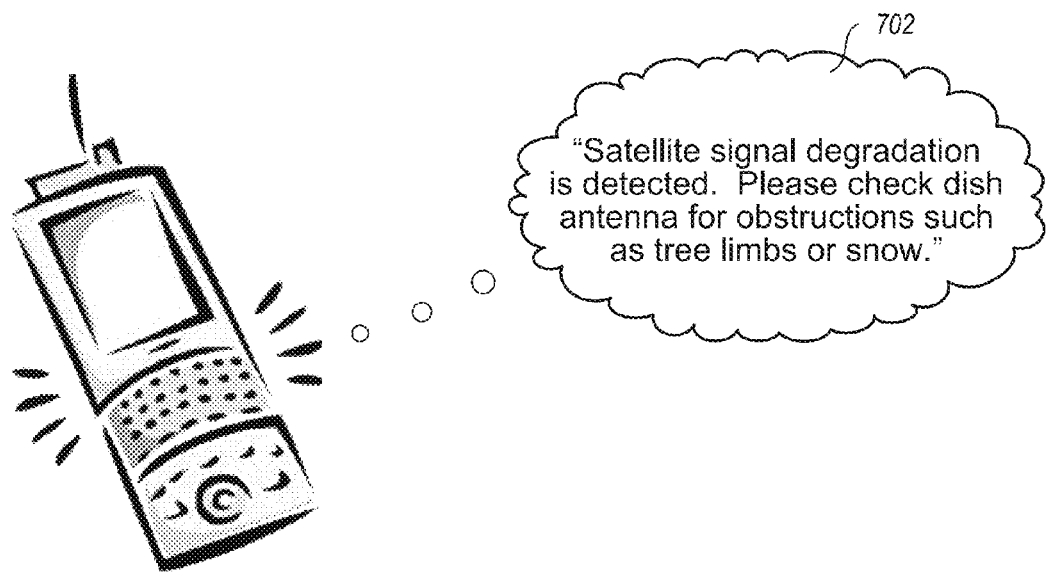

With reference to FIGS. 7A and 7B, once the health status report is available, transmitting status information can further include communicating one or more alert messages by the content provider support network 250 to the IVR system 256 for presentation to the subscriber 224 via the voice menu or via a display, for example, a mobile display on a cell phone, tablet computer, or the like. Exemplary alert messages for common error states are shown in FIGS. 7A and 7B as alert messages 700, 701, and 702, respectively. If the status report indicates, for example, that a hard drive within the set top box 202 keeps rebooting repeatedly, the alert message 700 may be communicated by the IVR system to the subscriber as part of the IVR automated script. In response, the subscriber 224 can schedule maintenance directly, circumventing the call center 258, and therefore not needing assistance from the CSR 260.

Furthermore, such an approach improves customer service by allowing subscriber equipment to be maintained efficiently. Within the health server 254 will be stored the exact model number of the set top box 202 as well as the part number for the replacement hard disk drive or comparable replacement parts needed in order to fully repair the set top box. Accordingly, when the alert message 700 is sent to the subscriber 224 with instructions to replace the hard drive or DVR 306 in the near future, the health server 254 also sends a notice to the parts center indicating that the spare part should be ordered that matches that particular set top box. In one embodiment, the user will be prompted via the interaction with the IVR system 256 in order to perform the repair on a selected date, for example, by using a query following the notice shown in FIG. 7A that the hard drive or DVR 306 is detected as a potential failure. The next query from the IVR system can be a request whether or not the subscriber 224 wishes to schedule a repair time. If so, the subscriber can input a suggested time and date at which a technician can come and repair or replace the set top box 202 so the service can continue uninterrupted. Thus, the health server 254 is able to access, through its database storage system, all the information needed for part replacement, scheduling of the technician to perform the repair, receiving the input from the subscriber 224 regarding the desire for repair and preferred dates. Then, having organized the information, the health server 254 can further send a visit request to the customer service technician and put it into their calendar or work schedule so they know to visit this particular subscriber at the address shown in the system in order to perform the repair on the selected date. The subscriber 224 can then access the health server information via the IVR system 256 in order to identify the part to be fixed, obtain a spare part, and schedule a visit from a technician to come repair the set top box 202, and so forth. Of course, this applies to all serviced parts of the content server system 200, from the dish 206 to the remote control 226.

As another example, the interactive alert message 701 prompting the user to select an option, as shown in FIG. 7A, can be communicated to a subscriber based on status information or statistical data stored in the health server database 458. For example, health history data in the health server database may show a weak signal strength received by the content receiver 202 from the remote control 226. In response, the control software 475 can then cause the IVR system microprocessor to execute a 'dead battery' script. Alternatively, if statistics show that dead batteries are the most frequent problem experienced by customers, the control software 475 can automatically cause the IVR system microprocessor to execute the 'dead battery' script at bear the beginning of every interactive menu. If the customer answers 'yes' the control software can then verify the remote control status by fetching signal strength data from the health server and communicate that data to the customer.

As another example, the alert message 702 shown in FIG. 7B, can pre-empt a service call to the CSR by automatically proposing, via the IVR system, a solution to the subscriber 224 that they can implement on their own. In the example shown, the system can recognize that there is a significant and unexpected drop in the quality of the signal being received at the satellite dish, and the IVR system alerts the subscriber to go check for obstructions prior to losing service and without the need to contact the CSR, or even a maintenance technician.

Further, the health server 254 will keep a record of all types of service that needs to be provided, and would recognize whether or not a particular customer has experienced antenna obstructions on a regular basis, such as several times a month, or whenever the wind in a local area exceeds a certain level. Since the health server 254 is able to receive metadata, such as weather conditions, the health server 254 will be able to match the weather conditions with repeated obstructions of the satellite dish. Thus, the health server 254 can send a recommendation that, since when the wind blows, the satellite dish antenna 26 is blocked, the user may consider trimming a tree or moving the satellite dish antenna to a new location. The health server 254 is therefore able to do a long term health history match between all parts of the system and other events that are occurring with respect to the system.

While particular devices and methods for automatically handling equipment service calls have been described with respect to FIGS. 1-7B, many other devices and methods for automatically assigning recording priorities can be implemented utilizing principles of the present disclosure, as will be apparent to those of skill in the art in light of the present disclosure. All such other devices and methods fall within the scope of the present disclosure.

The various embodiments described above can be combined to provide further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A customer service routing system, comprising:
    a plurality of subscriber equipment for a subscriber, including a content receiver in communication with at least one other subscriber equipment and a display, the content receiver configured to receive video media content for presentation on the display;
    an interactive response system that selects a plurality of interactive queries for the subscriber in response to a communication from the subscriber, the plurality of interactive queries are selected based on an equipment-of-interest of the plurality of subscriber equipment that has a potential problem; and
    a health server in communication with the content receiver and the interactive response system, the health server including:
        a microprocessor; and
        a processor-readable non-transitory medium having computer-executable instructions stored thereon that cause the microprocessor to:
            receive health status information for the plurality of subscriber equipment from the content receiver, wherein the health status information includes information regarding interruptions in television signals provided to the content receiver and a signal strength of television signals received by the content receiver;

determine the equipment-of-interest from the plurality of subscriber equipment based on the health status information;

generate an informational response to correct the potential problem of the equipment-of-interest based on the equipment status information; and provide the informational response to the interactive response system for communicating to the subscriber.

2. The customer service routing system of claim 1, wherein the plurality of subscriber equipment further includes a satellite receiving antenna in communication with the content receiver to transmit the video media content to the content receiver.

3. The customer service routing system of claim 1, wherein the plurality of subscriber equipment further includes a remote control unit configured for wireless communication with the content receiver.

4. The customer service routing system of claim 1 wherein the content receiver includes one or more of
a radio receiver;
a set top box configured to provide media content to a media playback device; and
a networked device configured to stream media content via the Internet to the media playback device.

5. The customer service routing system of claim 4 wherein the media playback device includes one or more of a television, an audio system, or a recorder configured to store the media content for delayed playback.

6. The customer service routing system of claim 1 wherein the health status information includes one or more of remote control battery voltage levels, timer conflicts, unauthorized security access attempts, parts order status, hardware failure, and alert messages.

7. A computer-implemented method of operating a customer service routing system, the method comprising:
receiving an inquiry from a subscriber via a network interface;
identifying, using a microprocessor, a plurality of equipment logically associated with the subscriber;
storing subscriber equipment status information for the plurality of equipment, the status information including health history data of a content receiver configured to receive video media content for presentation on a display, the health history data including a history of signal interruptions to, and a signal strength of, the content receiver;
determining at least one equipment of the plurality of equipment from the plurality of equipment that has a potential problem based on the status information for the plurality of equipment;
generating an informational response to correct the potential problem of the at least one equipment based on the status information for the at least one equipment; and
communicating the informational response to the subscriber via an interactive response system.

8. The method of claim 7, wherein the inquiry is a telephone call, the network interface is a telephone network interface and the interactive response system is an interactive voice response system.

9. The method of claim 7, wherein the inquiry is an electronic message, the network interface is a data network interface and the interactive response system communicates visual queries to the subscriber on a mobile display.

10. The method of claim 9, wherein the one or more electronic status messages include one or more alert messages to the subscriber, the alert messages containing instructions for resolving the potential problem with the at least one equipment indicated by the status information.

11. The method of claim 7, further comprising searching external databases for metadata relating to a reported failure mode.

12. An interactive response system, comprising:
a network interface configured to receive one or more inquiries from a customer and transfer the inquiries for processing according to an interactive response script; and
an equipment health server that includes:
a microprocessor;
an equipment health server database that stores equipment status information including health history data of a plurality of subscriber equipment in communication with a content receiver that is configured to receive video media content for presentation on a display, the health history data including signal interruptions to, and a signal strength received by, the content receiver; and
a non-transitory database memory in communication with the microprocessor, the database memory having computer-executable instructions stored thereon that cause the microprocessor to:
obtain the equipment status information for the plurality of subscriber equipment;
determine an equipment-of-interest from the plurality of subscriber equipment based on the equipment status information stored in the equipment health server database, wherein the equipment-of-interest has a potential problem;
generate an informational response to correct the potential problem of the equipment-of-interest based on the equipment status information; and
communicate the informational response to the customer via the interactive response script.

13. The interactive system of claim 12, wherein the network interface is a telephone network interface, the inquiries are telephone calls, and the interactive response script is an interactive voice response script that communicates with the customer by telephone using audible prompts.

14. The interactive system of claim 12, wherein the network interface is a data network interface, and inquiries are electronic messages, and the interactive response script is an interactive message response script that communicates with the customer via a display using visual prompts.

15. The interactive system of claim 14 wherein the display is a remote control interface.

16. The interactive system of claim 12 wherein the network interface includes a telephone network interface and a data network interface, and the interactive response script is an interactive message response script that communicates with the customer via telephone using audible prompts and via a display using visual prompts.

17. The interactive system of claim 12 wherein the plurality of subscriber equipment includes the content receiver.

18. The system of claim 1 wherein the plurality of subscriber equipment includes media service subscriber equipment provided by a media service provider.

19. The system of claim 1 wherein the health history data further includes a signal strength received by a satellite antenna.

20. The system of claim 3 wherein the health history data further includes a condition of the remote control unit.

21. The system of claim 3 wherein the health history data further includes a battery strength of the remote control unit.

* * * * *